US012079886B2

(12) United States Patent
Corsini et al.

(10) Patent No.: US 12,079,886 B2
(45) Date of Patent: Sep. 3, 2024

(54) SYSTEM AND METHOD FOR MANUFACTURING A PRODUCT IN A DISTRIBUTED ENVIRONMENT

(71) Applicant: Siemens Aktiengesellschaft, Munich (DE)

(72) Inventors: Giorgio Corsini, Genoa (IT); Andrea Loleo, Genoa (IT); Ernesto Montaldo, Genoa (IT); Ornella Tavani, Genoa (IT); Giovanni Venturi, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 187 days.

(21) Appl. No.: 17/709,655

(22) Filed: Mar. 31, 2022

(65) Prior Publication Data

US 2022/0358605 A1 Nov. 10, 2022

(30) Foreign Application Priority Data

Mar. 31, 2021 (EP) .................................... 21166188

(51) Int. Cl.
*G06Q 50/04* (2012.01)
*G06Q 10/0631* (2023.01)

(52) U.S. Cl.
CPC ....... *G06Q 50/04* (2013.01); *G06Q 10/06313* (2013.01)

(58) Field of Classification Search
CPC .......................................... G06Q 10/00–50/00
(Continued)

(56) References Cited

U.S. PATENT DOCUMENTS 6,345,259 B1 * 2/2002 Sandoval ............... G06Q 20/20
700/109
7,289,867 B1 * 10/2007 Markle ................ G05B 19/418
700/121
(Continued)

FOREIGN PATENT DOCUMENTS

EP 3667579 A1 6/2020

OTHER PUBLICATIONS

Cheng, Fan-Tien, et al. "Development of a distributed object-oriented system framework for the computer-integrated manufacturing execution system." Proceedings. 1998 IEEE International Conference on Robotics and Automation (Cat. No. 98CH36146). vol. 3. IEEE, 1998. (Year: 1998).*

(Continued)

*Primary Examiner* — Alan S Miller
(74) *Attorney, Agent, or Firm* — Laurence A. Greenberg; Werner H. Stemer; Ralph E. Locher (57) ABSTRACT

A method and system for dispatching a production order for a product within a distributed environment with several production lines $L_j^{Si}$ distributed in one or several production sites Si. A production order for the product is received with a first list of required production parameters, with an ordered target value for each required production parameter. A nominal set of production lines $L_j^{Si}$ is automatically determined that are capable of implementing the production of the product with respect to resource availability and sets are selected from a nominal set of production lines and from a production scenario. The system selects a first set, a second set and a third set of production lines from the nominal set and then automatically determines one or more optimal production lines for producing said product and then dispatches the production order to the optimal production line(s).

15 Claims, 2 Drawing Sheets (58) Field of Classification Search
USPC .............................................. 705/7.11–7.42
See application file for complete search history.

(56) References Cited

U.S. PATENT DOCUMENTS

| | | | | |
|---|---|---|---|---|
| 11,720,033 | B2* | 8/2023 | Fan | G03F 7/70858 355/30 |
| 2005/0096770 | A1* | 5/2005 | Chua | G05B 19/41865 700/102 |
| 2009/0012641 | A1* | 1/2009 | Ruggieri | G05B 19/41865 700/100 |
| 2010/0057240 | A1* | 3/2010 | Giebels | G06Q 50/04 700/105 |
| 2019/0347590 | A1* | 11/2019 | Rajasekaran | G06Q 10/0635 |
| 2020/0175447 | A1* | 6/2020 | Lamparter | G06N 5/01 |
| 2021/0400675 | A1* | 12/2021 | Lee | H04W 72/53 |
| 2022/0019204 | A1* | 1/2022 | Maury | G05B 19/4188 |
| 2022/0066412 | A1 | 3/2022 | Montaldo et al. | |

OTHER PUBLICATIONS

Du, Laihong, Yadong Fang, and Yanli He. "Manufacturing resource optimization deployment for manufacturing execution system." 2008 Second International Symposium on Intelligent Information Technology Application. vol. 1. IEEE, 2008. (Year: 2008).*

Helo, Petri, et al. "Toward a cloud-based manufacturing execution system for distributed manufacturing." Computers in industry 65.4 (2014): 646-656. (Year: 2014).*

\* cited by examiner

SYSTEM AND METHOD FOR MANUFACTURING A PRODUCT IN A DISTRIBUTED ENVIRONMENT

CROSS-REFERENCE TO RELATED APPLICATION

This application claims the priority, under 35 U.S.C. § 119, of European Patent Application EP 21166188.9, filed Mar. 31, 2021; the prior application is herewith incorporated by reference in its entirety.

FIELD AND BACKGROUND OF THE INVENTION

The invention relates to a method and system for manufacturing, notably automatically, a product in a distributed environment with several production lines that are distributed in one or several production sites. The present invention refers also in particular to the dispatching of production orders to the production lines of the one or several production sites. More generally, the present invention relates to manufacturing execution systems (MES). Most recently, the term Manufacturing Operation Management (MOM) is more and more used to replace the term MES.

As defined by the Manufacturing Enterprise Solutions Association (MESA International), a MES/MOM system "is a dynamic information system that drives effective execution of manufacturing operations," by managing "production operations from point of order release into manufacturing to point of product delivery into finished goods" and by providing "mission critical information about production activities to others across the organization and supply chain via bi-directional communication." In addition, the ISA-95 standard describes in detail the meaningful resources that a manufacturing process has to consider in order to optimize and streamline the production process. The focus is in particular on the management of materials, equipment, tools and personnel. Typically, a MES system connects, monitors, and controls complex manufacturing production processes and data flows within an enterprise. One of the main goals of a MES system is to ensure effective execution of the manufacturing operations and to improve production output.

The functions that MES/MOM systems usually include, in order to improve quality and process performance of manufacturing plants, are resource allocation and status, dispatching production orders, data collection/acquisition, quality management, maintenance management, performance analysis, operations/detail scheduling, document control, labor management, process management and product tracking. For example, the Siemens Corp. offers a broad range of MES/MOM products under its SIMATIC IT® product family. MES- or MOM systems, such as SIMATIC IT®, manage and monitor the production of a vast diversity of products.

The present invention is more particularly interested in the management of production orders that impacts the production of a product. The term Production Order Management (hereafter "POM") refers to a set of processes in charge of tracking customer orders, providing a planning and resources for satisfying order requirements. According to traditional MES systems, a POM is designed as a monolithic, single-plant application.

Unfortunately, such a monolithic POM design is not adequate anymore in an environment of Industry 4.0, wherein globalization (wider distribution of production sites) and customization (production models focus on smaller production lots and flexible production volumes) requires more flexibility and efficiency in manufacturing production processes. Indeed, traditional MES systems are not able to cope with such a distributed environment where the manufacturing production processes are now described as a set of decomposed functionalities that are hierarchically distributed across the geographically distributed enterprise. Due to this lack, the dispatching of orders according to traditional MES systems has become less efficient, because it does not integrate a global view of the production capacities.

SUMMARY OF THE INVENTION

The present invention is based on a new design of the MES system, wherein the POM is implemented as a combination of at least an Order Management and an Order Execution functionality to better fit the globalization of the production. In other words, the POM according to the present invention is divided in several independent functionalities that are executed in a distributed and hierarchical system contrary to the POM being a whole and complete functionality in traditional MES.

In particular, the Order Management functionality is a global functionality that provides an entry point for collecting customer orders from an Enterprise Resource Planning (ERP) system, and Bill of Process (BoP) and Bill of Material (BoM) data from a Product Lifecycle Management (PLM) software (BoP and BoM data are referred, respectively, to the definition of the production process required to make a product, and the required materials). The Order Management functionality provides notably the logic to create production orders, split the production orders into sub-orders, and dispatch the production orders for their execution. On the other hand, and in particular, the Order Execution functionality is a local functionality that provides local order planning functionalities, such as scheduling of an order according to plant-specific constraints, and production order and production order steps execution, respecting the dependencies among them, and ensuring that all the necessary resources (e.g. equipment, material, personnel, etc.) are correctly allocated. In a very extensive view, both global order management and local order management functionalities can have multiple instances running at the same time at different enterprise levels.

In such a distributed environment, several Production Order Execution modules, each in charge of a local Order Execution functionality, might be coordinated by a unique, centralized, Order Management Module in charge of a global Order Management functionality. This is the case, for example, of a production site with multiple functionally equivalent production lines.

In such an environment, the dispatching of production orders is generally realized by scheduling tools available in the MOM system, wherein said scheduling tools are configured for optimizing resource allocation. Scheduling tools are notably used for arranging, controlling and optimizing work and workloads in a production or manufacturing process. A scheduling tool can allocate plant and machinery resources, plan human resources, plan production processes, and purchase materials, and aims to get the shortest release time for a received production order.

However, producing according to the shortest release time usually fails to optimize the production. Indeed, the dispatching of production orders is usually computed in function of the available resources (e.g., machine, material, personnel) at the time of reception of each production order so as to ensure the shortest release time. This is not always efficient or optimized for saving material, space, or money. For instance, shortening the release time may increase production scraps, or energy consumption, etc. Additionally, the current solutions for dispatching production orders do not provide any flexibility to a MES or MOM operator. The latter cannot decide where and how a production should be optimized, or if some production parameters shall be minimized or maximized for decreasing for instance a workload on a specific production line, or for reaching a specific product quality.

It is, therefore, an object of the present invention to provide a method and a system that are capable of optimizing the production, providing thus the efficient manufacturing of a product in a distributed environment, so that received production orders are intelligently dispatched within a production environment comprising several production lines distributed in one or several production sites, wherein said production sites are for instance sites that are remotely located with respect to each other.

With the above and other objects in view there is provided, in accordance with the invention, a method of dispatching a production order for a product in a distributed environment having a plurality of production lines $L_j^{Si}$ distributed in one or several production sites Si, the method comprising the following steps:

a) receiving, by a central system for managing production orders, the production order for the product, the production order including a first list being a list of required production parameters RPP for the product, wherein an ordered target value TV1 is defined for each required production parameter RPP of the first list;

b) automatically determining, by the central system and as a function of resource availability, a nominal set of production lines $L_j^{Si}$ capable of implementing a production of the product with respect to the resource availability;

c) automatically determining, by the central system, from the nominal set of production lines and from a production scenario configured for defining a second list and a third list, the second list being a list of production site constraint production parameters CPP, wherein a target value TV2 is associated with each production site constraint production parameter CPP of the second list, and the third list being a list of line specific production parameters LPP, wherein a target value TV3 is associated with each line specific production parameter LPP of the third list:

a first set of production lines comprising all production lines of the nominal set capable of satisfying the ordered target value TV1 of at least one required production parameter RPP defined in the first list;

a second set of production lines comprising all production lines of the nominal set capable of satisfying a target value TV2 of at least one production site constraint production parameter CPP defined in the second list;

a third set of production lines comprising all production lines of the nominal set capable of satisfying the target value TV3 of at least one line specific production parameter LPP defined in the third list;

d) automatically determining, by the central system and from the previously determined first, second and third sets of production lines, at least one optimal production line for producing the product; and e) automatically dispatching the production order to the at least one optimal production line.

In other words, according to the present invention, the production of products within a distributed environment comprising several production lines distributed in one or several production sites is optimized by finding one or several productions lines offering a right balance between several sets of required or constraint production parameters, like an allocation of resources, an energy consumption, an availability date, production scraps, production speed, working costs, average delay on due date, material consumption, line availability, etc. The production parameter according to the invention is a quantitative or measurable parameter whose value can be used for configuring a production line, i.e., for setting a production line so that its production satisfies said production parameter.

The present invention proposes notably to automatically select the most adequate production(s) line(s) within said distributed environment in function of said sets of production parameters, the latter being preferentially Key Performance Indicators (KPI), defined for each production site, each received production order, and each production line. Each set of parameters, e.g. KPI, is thus defined at a different level of the distributed environment: at a first level corresponding to production parameters required by a customer request, at a second level corresponding to production parameters required or provided by a production site, and at a third level corresponding production parameters required or provided by a production line. From the production parameters required by a customer, a production scenario is defined wherein production parameters for the second level and third level are selected and defined, and wherein target values to be complied with are attributed to each production parameter of the second and third level. By determining which production line(s) is or are capable of satisfying the target values determined at each level, it is then possible to select the most adequate production line(s) for responding to the customer request and to produce a requested product in an optimized way. As mentioned previously, the production parameter is preferentially a KPI. In that case, the target value is defined as a KPI value which is a measurable or quantitative value (e.g. an energy value, a time value, a product quality value, a cost value, . . . ) associated to one or several production steps.

The previously mentioned objective is indeed achieved according to the present invention by a method for dispatching a production order for a product, and optionally for manufacturing said product, in a distributed environment comprising several production lines distributed in one or several production sites Si, the method comprising the following steps:

receiving, by a central system for managing production orders, said production order for said product, said production order comprising a list of required production parameters, e.g. required KPIs, said list being called hereafter the first list, said list comprising at least one required production parameter, and wherein each required production parameter, e.g. each required KPI, is associated to an ordered target value that has to be complied with or satisfied by said product or its production. Said ordered target value is thus a target value defined for said required production parameter and defines thus a requirement that has to be satisfied by said product or its production with respect to the required production parameter. Said first list of required production parameter comprises for instance at least one of the following requirements: a product quality level, a due date, a production cost, a material and/or energy consumption, an average delay on due date, etc.

The production order typically comes from a customer request and might be entered in said central system either by an operator or automatically determined by the central system from the customer request;

automatically determining, by said central system, a nominal set of production lines $L_j^{Si}$ distributed in said one or several production sites Si, wherein said nominal set comprises production lines $L_j^{Si}$ that are each capable of satisfying (i.e. implementing) the production of said product with respect to resources available for the considered production line $L_j^{Si}$. The resources according to the invention comprise for instance at least one of the following resources: equipment or machinery, material, personnel. The central system may comprise a known in the art scheduling tool for optimizing the resource allocation;

using, by said central system, a production scenario for the production of said product. Said production scenario can be received or selected by the central system. Said production scenario is configured for defining:

a list of production site constraint production parameters, e.g. production site constraint KPIs, said list being called hereafter the second list, and comprising for the production lines of said one or several production sites at least one production site constraint production parameter. For instance, said second list associates to a production line of a production site, preferentially to each production line of said one or several production sites, at least one production site constraint production parameter defined for the considered production line and based on the considered production site constraints or requirements. In particular, said production site constraint production parameters might be the same for all production lines, or preferentially for all identical production lines, of a same production site;

and a list of line specific production parameters, e.g. line specific KPIs, said list being called hereafter the third list, and comprising for said production lines of said one or several production sites at least one line specific production parameter, e.g. at least one line specific KPI. For instance, said third list associates to a production line of a production site, preferentially to each production line of said one or several production sites, at least one line specific production parameter defined for the considered production line and based on the production characteristics or requirements of the considered production line. In particular, said line specific production parameter might be the same for all identical production lines;

and for each production site constraint production parameter of said second list and respectively for each line specific production parameter of said third list, an associated value that is a target value for the considered parameter. In other words, the scenario defines, preferentially for each production lines of said one or several production sites, a target value for each production site constraint production parameter of said second list, and a target value for each line specific production parameters of said third list, the number of target values defined respectively for the second and third list being thus equal to respectively the number of production site constraint production parameters of the second list and the number of line specific production parameters of the third list. The scenario might be chosen by said operator and provided as input to the central system, or it might be automatically determined or generated by the central system or predefined (e.g. by a production expert) in a memory of the latter or in a central database in function of a type of product that has to be produced, and/or in function of the list of required production parameters defined in the production order. Each production site constraint production parameter value defines a production site constraint (i.e. a target) to be reached (i.e. satisfied or complied with) for a production process used for producing said product. It can be related to an energy consumption (e.g. minimizing energy consumption, the production site constraint production parameter value indicating for instance a maximum energy consumption that shall not be exceeded), to a utilization of production lines (e.g. full utilization of the production line), a maximum authorized delay on due dates, etc. Each line specific production parameter value defines a production line characteristic or feature or variable that has to be reached or complied with by the concerned production line. It can be related to an availability (i.e. the ratio between operating time and total time), a scrap value (e.g. a maximum scrap value), line speed, material consumption, etc., of a production line. According to the present invention, the production site constraint production parameter is defined with respect to a production site, while the line specific production parameter is defined with respect to a production line. Preferentially, the central system is configured for automatically ordering (i.e. classifying) the required production parameters in said first list according to an order of importance from the most important required production parameter to the least important required production parameter that has to be satisfied if said first list comprises more than one required production parameter. The same applies to the second and third lists, wherein the central system is configured for automatically ordering respectively the production site constraint production parameters and the line specific production parameters according to a respective order of importance, from the most important to the least important one, if said second and respectively third list comprises respectively more than one production site constraint production parameter and more than one line specific production parameter;

automatically determining, by the central system, from the nominal set of production lines and from to the production scenario:

a first set of production lines comprising all production lines of said nominal set of production lines capable of satisfying the ordered target value of at least one, e.g. of only the most important, preferentially all required production parameters defined in the first list. Preferentially, the central system is configured for ordering/classifying the selected/determined production lines of said first set according to a degree of satisfaction of said at least one, preferentially of all, required production parameters ordered target values, e.g. from the product line that best satisfies the ordered target value of each of said required production parameters to the product line that least satisfies said value. Preferentially, a target value, whether defined for a production site constraint production parameter, required production parameter, or line specific production parameter, is considered as satisfied or complied with if the value defined for or characterizing a considered production line falls within a predefined interval comprising said target value. In other words, a production line characterized by a production or characteristic value, whether related to production site constraint production parameter, required production parameter, or line specific production parameter, that is close to a target value might be considered as satisfying or complying with said target value;

a second set of production lines comprising all production lines of said nominal set of production lines capable of satisfying the value of at least one, e.g. of only the most important, preferentially of all, production site constraint production parameters defined in the second list. Preferentially, the central system is configured for ordering/classifying said production lines of said second set according to a degree of satisfaction of said at least one, preferentially of all, production site constraint production parameters values, e.g. from the production line that best satisfies the value of each of said production site constraint production parameters to the production line that least satisfies said value;

a third set of production lines comprising all production lines of said nominal set of production lines capable of satisfying the value of at least one, e.g. of only the most important, preferentially of all, line specific production parameters defined in the third list. Preferentially, the central system is configured for ordering/classifying said production lines of said third set according to a degree of satisfaction of said at least one, preferentially all, line specific production parameter values, e.g. from the production line that best satisfies the value of each line specific production parameter to the production line that least satisfies said value;

automatically selecting or determining, by the central system, and from the previously first, second and third sets, the most suitable production line(s), i.e., the optimal production line(s) for producing said product. For instance, the central system may use a Constraint Satisfaction algorithm or constraint solver, using as input the first, second and third sets of production lines as well as the target values defined for the first, second and third list, as constraints to be solved. The output is then a set of production lines, called optimal production lines, that meet or satisfy all target values (i.e., constraints). Said optimal production lines within the obtained set might be ordered from the production line that is the most suitable for producing said product (i.e., that best satisfies all target values) to the production line that is the least suitable (i.e., that least satisfy all target values). Preferentially, the constraint satisfaction algorithm might be configured for determining an intersection between said first, second and third set, said intersection defining the set of production lines that belong at the same time to the first, second and third set, and which satisfy thus all target values. In particular, if the production lines are already ordered in each of the first, second and third sets, then the central system might assign a weighting to this ordering (e.g. the first production line of each set getting a weight higher than the next production line in said ordering, wherein the weights are predefined in function of the production parameter independently from any target value) so that the production lines belonging to said intersection between said sets might be ordered according to their assigned weightings, resulting in a set of ordered optimal production lines, wherein the first optimal production line of the resulting set is the optimal production line that best satisfies all target values;

automatically dispatching the production order to said optimal production line(s). In particular, the production order might be dispatched to said first optimal production line of said set of ordered optimal production lines;

optionally, automatically manufacturing said product by said optimal production line(s), e.g. by said first optimal production line.

Regarding the classification of the production lines in each of said first, second and third sets, different known techniques, e.g. based on weightings, might be used by the central system for determining a degree of satisfaction that is associated to a production line with respect to a set of target values, so as to define thus an order among the production lines of each of the above-mentioned sets, for instance from the production line that best satisfies the target values taken as a whole set, to the production line that least satisfies said target values taken as a whole set. The goal is that, in each of said sets, the production lines are ordered from the production line that would provide the optimal production with respect to the set of target values defined in connection with the considered set of production lines, to the production line that would provide the least optimal production. Such a system based on weights might also be used for ordering the so-called optimal production lines in the previously mentioned intersection.

The objective of the present invention is also solved by a system for dispatching production order for a product, and optionally manufacturing said product, in a distributed environment comprising several production lines $L_j^{Si}$ distributed in one or several production sites Si, the system comprising:

a central system for managing production orders, said central system comprising at least a processor and a memory, the central system comprising preferentially a scheduling tool configured for optimizing resource allocation;

for each production site, a Production Order Execution module configured for managing the production at said production site and for controlling the production site production lines in order to enable a production of said product, each Production Order Execution module being connected to the central system;

optionally, for manufacturing said product, one or several production lines at each production site, each production line being configured for communicating with said Production Order Execution module designed for equipping said production site;

the system according to the invention being configured for carrying out the steps of the method for manufacturing a product within a distributed environment as summarized above.

In particular, the system according to the invention comprises a central database connected to the central system and to each production module. Said central database is preferentially configured for storing and updating production parameters for the production lines of the distributed environment. In particular, the central database comprises for each production line, a predefined list of line specific production parameters comprising, for each line specific production parameter, a current value associated to the latter and defined for the concerned production line, a predefined list of production site constraint production parameters comprising, for each production site constraint production parameter, a current value associated to the latter and defined for the concerned production line, a predefined list of required production parameters comprising, for each required production parameter, a current value associated to the latter and defined for the concerned production line.

Additionally, said central database is configured for storing multiple scenarios, wherein each scenario is predefined in function of a type of product that has to be produced, and/or in function of a list of required production parameters, and/or of the ordered target value associated to each required production parameter. According to the present invention and preferentially, when the central system receives a new production order, it automatically determines the predefined scenario corresponding to this new order (e.g the predefined scenario associated to a same product or type of product, and to similar or identical required production parameters). Additionally, each predefined scenario is configured for defining said second list of production site constraint production parameters, said third list of line specific production parameters, and for associating to each production site constraint production parameter of said second list and respectively to each line specific production parameter of said third list, a target value. Thus, in function of the required production parameters and product to be produced, the central system may automatically select one of said predefined scenario, the latter becoming thus the production scenario used by the central system for computing the automatic selection or determination of the first, second and third sets of production lines, using as input said production scenario, the nominal set of production lines, the required production parameters and their associated ordered target values. The central system is thus configured for determining, among the predefined scenarios, which one best matches or models the required production parameters and product to be produced defined in the received production order, said best matching or modeling predefined scenario defining said second and third list which are then used by the central system to determine, from production parameter current values stored in the central database for the production lines, whether a considered production line can satisfy or not a target value.

Other features which are considered as characteristic for the invention are set forth in the appended claims.

Although the invention is illustrated and described herein as embodied in a system and method for manufacturing a product in a distributed environment, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
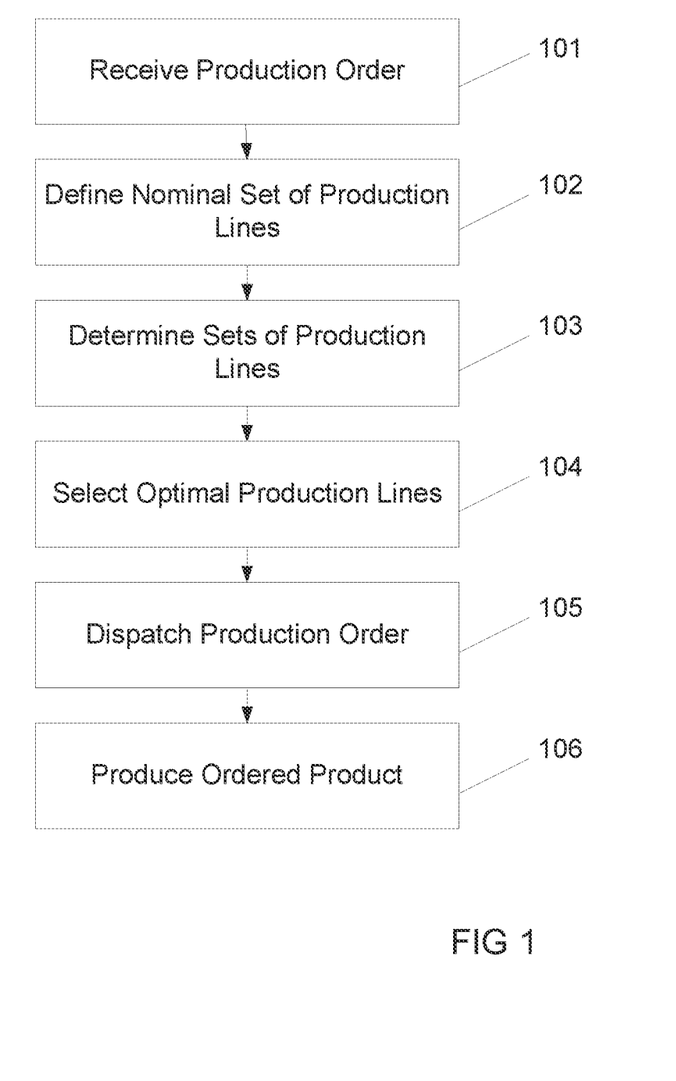
FIG. 1 is a schematic flow chart of a preferred embodiment of the method according to the invention.
Figure 2:
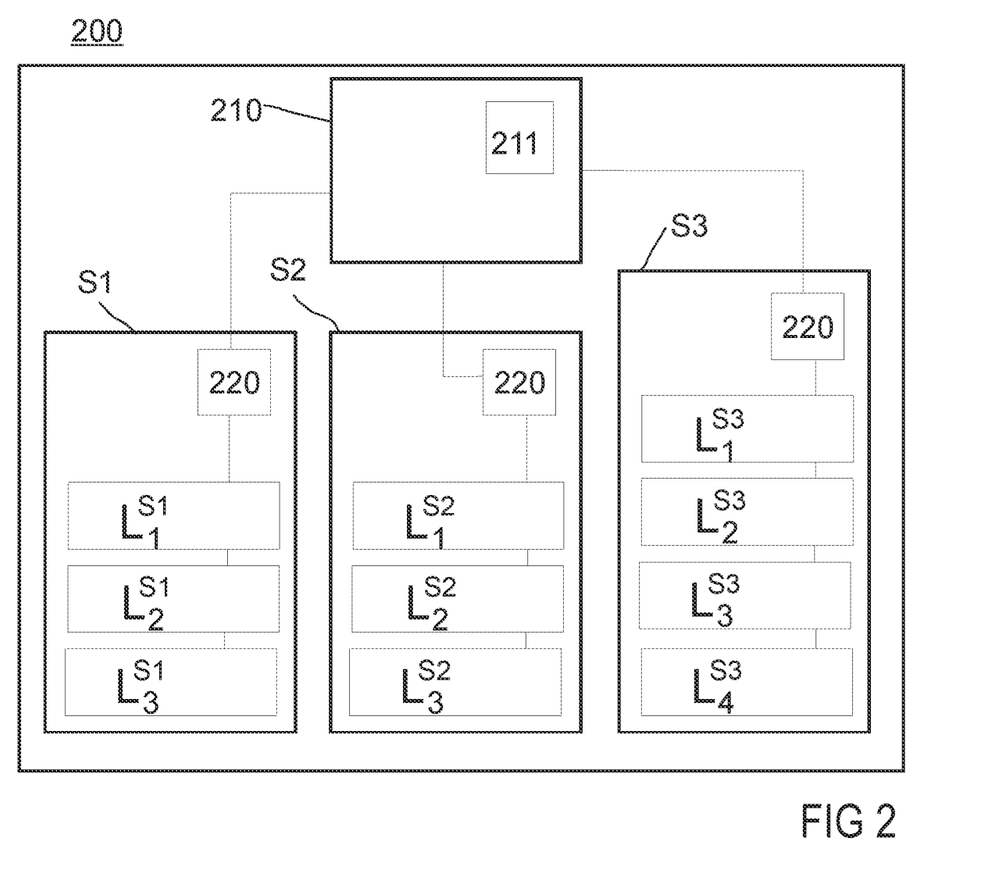
FIG. 2 is a schematic diagram of a system for manufacturing a production order according to the invention.

The present invention resides in the technical field of manufacturing execution systems (MES/MOM). FIG. 1 schematically describes the steps of the method according to the invention and FIG. 2 provides a preferred embodiment of a system 200 for manufacturing a product in a distributed environment comprising several production lines $L_j^{Si}$ distributed in one or several production sites Si, wherein $i=1, \ldots, n$, with n being the number of the production sites, and $j=1, \ldots, m^{Si}$, with $m^{Si}$ being the number of production lines for the production site Si. In the example illustrated by FIG. 2, one has n=3, i.e., there are 3 productions sites, which are the production sites S1, S2, and S3, wherein the production site S1 comprises 3 production lines, namely $L_1^{S1}$, $L_2^{S1}$ and $L_3^{S1}$; the production site S2 comprises 3 production lines, namely $L_1^{S2}$, $L_2^{S2}$ and $L_3^{S2}$; and the production site S3 comprises 4 production lines, namely $L_1^{S3}$, $L_2^{S3}$, $L_3^{S3}$, and $L_4^{S3}$. The production sites are distant, i.e., geographically separated from each other. By way of example, one production site may be in one country, and another production site may be in another country. Each production site Si comprises at least one Order Execution module 220, configured for communicating with each production line of the production site in order to manage and/or control the production by the production lines of the production site, and for communicating with a central system 210. The central system 210 preferably comprises a central database 211, which might be connected to the production lines of each production site, e.g. via/through the Order Execution module 220 in order to receive or exchange relevant production data for said production lines. The central system 210 is configured for receiving a customer request for a production of a product. For each customer request received, it has to determine which production line, or set of production lines, is adequate for producing the requested product. "Adequate" means that the production line(s) that will be chosen for the production of the product are configured for optimizing said production when taking account of different production parameters at different levels of the structural hierarchy of the distributed environment. Indeed, one of the tasks of the central system is to dispatch production orders for the production requests received from customers. The central system 210 provides thus a global order management running at a first level (top level) of the structural hierarchy shown in FIG. 2, each of the production sites Si corresponding to a second level of said structural hierarchy, and each production line $L_j^{Si}$ belonging to a third level of said structural hierarchy. According to the present invention, the central system 210 is configured for dispatching the production order for a product to the production line(s) that is able to optimize the production when considering production parameters at the first, second and third levels.

At each level, different production parameters are defined as a function of the constraints, requirements, equipment characteristics, etc. The present invention proposes a central system configured for taking account of the production parameters defined at each level for determining the optimal production line(s) for said production:

at the first level, a production order for a customer defines a first list of required production parameters. They can be, according to the present embodiment, required KPIs. The production order might come directly from the customer or might be generated from a customer request. For each required production parameter $RPP_p$ of said first list, an ordered target value $TV1_p$ ("TV1" will be used hereafter to refer to "ordered target value"), with $p=1, \ldots, P$, with P being the number of required production parameters of said first list, is defined by the production order. For instance, said first list can comprise required KPIs, wherein a required KPI value is provided for a quality level of the ordered product, another required KPI value is provided for a due date for delivering the ordered product, and yet another required KPI value is associated to the costs of the production. In other words, at the first level, the production order is configured for defining a list of required KPIs and for associating to each required KPI a target value defined for the ordered product (e.g. due date, costs, expected quality, etc.);

for the second level, the central system takes into account constraint production parameters of each production site. The constraint production parameters are typically constraint KPIs bound to the production site for reaching specific target values during the production process of said product by a production line of the considered production site. According to the present invention, the central system determines or selects for each production line of each production site said second list of production site constraint production parameters. The latter define, for the concerned production line, which constraints at the level of the production site have to be complied with/satisfied during a production process for said product in said production site, associating to each production site constraint production parameter $CPP_q$, a target value $TV2_q$ ("TV2" will be used hereafter to refer to "a target value for a production site constraint production parameter") for the production of said product, with q=1, ..., Q, Q being the number of production site constraint production parameters of said second list. There might be thus different production site constraint production parameters in said second list, each associated to a target value TV2, i.e., a target value that is specific to the production site constraint production parameter it is associated to. There might be for instance as many target values TV2 as there are production site constraint production parameters in the second list. An example of constraint KPIS that might be found in said second list are an energy consumption, an utilization of a line, a pollution parameter, etc.;

for the third level, the central system takes into account line specific production parameters. The latter are production line data indicating production characteristics of a production line, and/or features of the production line that may impact the production by said production line. According to the present invention, the central system determines or selects for each production line said third list of line specific production parameters, and associates to each line specific production parameter $LPP_r$, a target value $TV3_r$ ("TV3" will be used hereafter to refer to "a target value for a line specific production parameter"), with r=1, ..., R, R being the number of line specific production parameters of said third list. A line specific production parameter is typically a line specific KPI value. There might be thus different line specific production parameters in said third list, each associated to a target value TV3, i.e. a target value that is specific to the line specific production parameter it is associated to. There might be for instance as many target values TV3 as there are line specific production parameters in the third list. For instance, even if two production lines might be functionally equivalent, they might be characterized by different KPI values (e.g. due to more updated equipment or manual/automatic adapted production process, etc.) that may impact the production process. The central system takes thus into consideration the line specific KPI values for optimizing the production of an ordered product. Said line specific KPIs are for instance a production line availability, scrap, etc.

In order to be able to determine or select the second and third list, the central system 210 uses a production scenario. Preferably, several production scenarios are stored in the central database 211. Each production scenario defines, in function of a user input and/or the production order, e.g. from the required production parameters, and/or from the product itself and/or from the ordered target values TV1, said second list and said third list, and for the second list, a target value $TV2_q$ for each production site constraint production parameter $CPP_q$ comprised in said second list, and for the third list, a target value $TV3_r$ for each line specific production parameter $LPP_r$ comprised in said third list. The respective target values TV2, TV3, and optionally TV1, are then used for determining the most appropriate production line(s) for producing the ordered product. Preferably, multiple predefined production scenarios are comprised in the central database 211 and the central system automatically selects the scenario that has been predefined for the received production order in function of the required production parameters. For instance, each of said predefined scenarios defines the constraint KPIs and their associated target values for the second list, and the line specific KPIs and their associated target values for the third list.

In a preferred embodiment, the central system 210 comprises or communicates with said central database 211. Said central database 211 comprises for each predefined scenario said second and third lists. Preferably, said central database 211 may further comprise a list of each of the production sites Si of the distributed environment, and for each production site Si, a list of production lines $L_j^{Si}$ it comprises. Said central database is further configured for storing, for each production line $L_j^{Si}$ of the distributed environment, a predefined list of production site constraint production parameters associating to each production site constraint production parameter its current value, and a predefined list of line specific production parameters associating to each line specific production parameter its current value. Said current values are stored in the database and might be updated, e.g. on a regular basis. Said current values are used by the central system 210 to check whether a production line is able to comply with or satisfy target values. For instance, if the second list comprises, as target value TV2, a maximum value for energy consumption, the central system can find in the predefined lists associated to a production line of a considered production site what is the current value characterizing the energy consumption of said production line and determine thus whether said current value stored for said production line is able to satisfy the target value TV2 for energy consumption associated to the production site constraint production parameter of said second list. Additionally, the central database 211 may comprise a nominal list of required production parameters comprising all required production parameters defined in the corresponding predefined list of each production line and associates to each required production parameter a value, that can be used by the central system for creating scenarios, notably based on known in the art machine learning techniques, storing thus in the central database multiple scenarios, wherein each scenario is a function of a set of required production parameters of said nominal list and the corresponding associated values stored for the required production parameters of said set. For instance, the central database 211 is configured for comprising multiple scenarios, that are preferentially automatically determined by the central system using for instance said machine learning technique, wherein each scenario is predefined for a production of a product and a set of required production parameters with optionally their associated values, said set being defined or determined in function of said nominal list of required production parameters, and wherein the central system 210 is configured for automatically selecting said production scenario among said multiple predefined scenarios in function of the product to be manufactured, the required production parameters, and optionally the ordered target values TV1.

Preferably, for each scenario, the central database 211 might be further configured for associating a weighting to each required production parameter comprised in said second list and another weighting to each line specific production parameter comprised within said third list of line specific production parameters, and finally, also a weighting to the required production parameters comprised in said predefined list of required production parameters. Said weightings enable to classify the production lines of the respective sets of production lines satisfying targeted values defined in association with the first, second and third list, from the production line that best satisfies the targeted values to the production line that least satisfy the targeted values.

FIG. 1 illustrates in more details the method according to the invention. The steps are as follows:

At step 101, the central system 210 receives a production order for a product, say, a bicycle. The production order comprises said first list of required production parameters RPP, associating an ordered target value TV1 to each of said required production parameters RPP. For instance, the first list comprises as required production parameters, a due date as a time, a production cost, and a quality level for said bicycle, and as respective target values, 6 months, 500 Dollars/bicycle, 0.6. The central system 210 might automatically order the required production parameters using the weightings defined in the central database for the predefined list of required production parameters, and if needed, normalized values associated with the required production parameters. For instance, the due date has a weight w_1, 1=0.9, the production cost has a weight w_1,2=0.8, and the quality level has a weight w_1,3=0.6, so that priority is given to the due date.

At step 102, the central system 210 automatically defines as a function of resource availability a nominal set of production lines. They are the production lines for which resources are available for producing the requested product. For this purpose, and as known in the art, the central system 210 might use a scheduling tool configured for optimizing resource allocation. For instance, said nominal set S_nominal of production lines may comprise the following production lines with respect to FIG. 2: S_nominal=$\{L_2^{S1}, L_3^{S1}, L_1^{S2}, L_1^{S3}, L_3^{S3}, L_4^{S3}\}$. The other production lines do not comprise the required resources (e.g. equipment, available personnel, or material) and are thus not considered for the manufacture of the bicycle.

Tt step 103, the central system 210 determines from said nominal set and a predefined production scenario three sets of production lines, namely a first set, a second set, and a third set. For this purpose, it first automatically selects in the central database or determines from said central database said predefined production scenario as a function of the required production parameters of said first list and the product to be produced, and optionally, the ordered target values TV1. Said scenario defines for instance that at the level of the production site, the second list comprises, as production site constraint production parameter CPP, an utilization of the production line, and that the associated target value TV2 to said utilization of the production line is greater than 3. Similarly, at the production line level, said scenario defines a third list comprising, as line specific production parameters LPP, a scrap parameter and a production speed, associating to each of the latter a target value TV3, for instance respectively a maximum scrap number and a minimum number of items (bicycles) produced per week. The central system determines then a first set of production lines comprising the production lines of S_nominal that are able to produce bicycles for 500 Dollars within the next 6 months with a quality level equal or higher than 0.6, a second set of production lines comprising the production lines of said nominal set characterized by a production line utilization greater than 3, and a third set of production lines comprising the production lines from said nominal set characterized by a scrap number lower that the maximum scrap number and a number of items produced per week higher than said minimum number. Thus, from production parameter values associated to the predefined lists stored in the central database for each production line, the central system determines for instance that:

a) said first set of production lines is S1_PL=$\{L_2^{S1}, L_3^{S1}, L_1^{S2}, L_1^{S3}, L_4^{S3}\}$, the production line $L_3^{S3}$ being not considered because of having a quality value lower than 0.6, b) said second set of production lines is S2_PL=$\{L_3^{S1}, L_1^{S2}, L_3^{S3}, L_4^{S3}\}$, the production lines $L_2^{S1}, L_1^{S3}$ being characterized, according to the values associated to their respective predefined list of production site constraint production parameter, by an utilization value lower than 3, and c) said third set of production lines is S3_PL=$\{L_2^{S1}, L_1^{S2}, L_1^{S3}, L_4^{S3}\}$, the production lines $L_3^{S1}, L_3^{S3}$ being characterized, according to the values associated to their respective predefined list of line specific production parameter, by respectively a scrap number higher than said maximum number, and a production speed lower than said minimum number.

At step 104, then central system 210 automatically determines from the first, second and third sets, the optimal production line(s) for producing said product. In particular, the central system 210 may automatically determine the optimal production line by running a constraint satisfaction algorithm or solver using as input said first, second and third sets of production lines and the target values defined in association with the first, second and third list, and providing as output, a set of optimal production lines, i.e. of production lines that optimally satisfy the target values when implementing a production of said product, in particular that meet said target values. For instance, the central system 210 might automatically determines an intersection I=S1_PL∩S2_PL ∩S2_PL=$\{L_1^{S2}, L_4^{S3}\}$ that results in a set of optimal production lines comprising the production lines that enable an optimal production of the requested product with respect to the first, second and third list of production parameters. As already explained, using weightings associated to the production parameters (required, production site constraint and line specific production parameter), the central system may automatically determine which production line in said subset is the best for an optimal production of the requested product, i.e. it can classify the production lines of this subset according to a degree of satisfaction of the target values associated to the production parameters of said first, second and third list.

At step 105, the central system 210 automatically dispatches the production order to the optimal production lines $\{L_1^{S2}, L_4^{S3}\}$;

Optionally, at step 106, the system 200 automatically manufactures said product by means of said optimal production lines, ensuring thus an optimal production.

In conclusion, the present invention advantageously provides a new concept for dispatching production orders to a nominal set of production lines by automatically finding the set of production lines that enable an optimal production and dispatching the production order to the latter. The system can autonomously distribute production orders in function of the determined set of optimal production lines, using a constraint satisfaction algorithm or solver, preferably based on KPIs, for automatically solving the constraint problem related to the first, second, and third list of production parameters to be satisfied or complied with for respectively the first, second and third level of the structural hierarchy of the distributed environment, providing thus more flexibility and a balance between the different target values associated to each production parameter.

The invention claimed is:

1. A method of dispatching a production order to produce a product in a distributed environment having a plurality of production lines $L_j^{Si}$ distributed in one or several production sites Si, the method comprising the following steps:
   a) receiving, by a central system for managing production orders, the production order for the product, the production order including a first list being a list of required production parameters RPP for the product, wherein an ordered target value TV1 is defined for each required production parameter RPP of the first list;
   b) automatically determining, by the central system and as a function of resource availability, a nominal set of production lines $L_j^{Si}$ capable of implementing a production of the product with respect to the resource availability;
   c) automatically determining, by the central system, from the nominal set of production lines and from a production scenario configured for defining a second list and a third list, the second list being a list of production site constraint production parameters CPP, wherein a target value TV2 is associated with each production site constraint production parameter CPP of the second list, and the third list being a list of line specific production parameters LPP, wherein a target value TV3 is associated with each line specific production parameter LPP of the third list:
      a first set of production lines comprising all production lines of the nominal set capable of satisfying the ordered target value TV1 of at least one required production parameter RPP defined in the first list;
      a second set of production lines comprising all production lines of the nominal set capable of satisfying a target value TV2 of at least one production site constraint production parameter CPP defined in the second list;
      a third set of production lines comprising all production lines of the nominal set capable of satisfying the target value TV3 of at least one line specific production parameter LPP defined in the third list;
   d) automatically determining, by the central system and from the previously determined first, second and third sets of production lines, at least one optimal production line for producing the product;
   e) automatically dispatching the production order to the at least one optimal production line; and
   f) producing a product on the at least one optimal production line according to the dispatched production order.

2. The method according to claim 1, which comprises automatically selecting, by the central system, the production scenario for the production of the product.

3. The method according to claim 2, wherein a central database is configured to consider multiple scenarios predefined for a production of a product as a function of a nominal list of required production parameters RPP and values associated to each of the required production parameters, and wherein the central system is configured for automatically selecting the production scenario among the multiple predefined scenarios as a function of the product to be manufactured and the required production parameters RPP.

4. The method according to claim 1, wherein the steps of automatically determining the optimal production line comprises running, by the central system, a constraint satisfaction algorithm or solver using as input the first, second and third sets of production lines, the ordered target values TV1 defined in association with the first list, and the target values TV2 and TV3 defined in association with second and third lists, and providing as output, a set of production lines, being optimal production lines, that optimally satisfy the ordered target values TV1 and the target values TV2 and TV3 when implementing a production of the product.

5. The method according to claim 4, wherein the constraint satisfaction algorithm is configured to automatically find an intersection between the first, second and third set of production lines, with the production lines being contained within the intersection forming the set of optimal production lines.

6. The method according to claim 4, which comprises employing a weighting technique associating a weight with each production parameter RPP, CPP, and LPP for ordering, in respectively the first, second and third sets, the production lines according to a degree of satisfaction of the target values TV1, TV2 and TV3 defined in association with respectively the first list, the second list, and the third list, from the production lines that best satisfy or meet the target values TV1, TV2 and TV3 to the production line that least satisfy or meet the target values TV1, TV2, and TV3.

7. A method for manufacturing a product within a distributed environment comprising a plurality of production lines $L_j^{Si}$ distributed in one or several production sites Si, the method comprising:
   producing a product according to a production order dispatched in accordance with claim 1;
   wherein said product is produced by automatically manufacturing the product by the optimal production line(s).

8. A system configured for dispatching a production order for a product in a distributed environment comprising a plurality of production lines $L_j^{Si}$ distributed in one or several production sites Si, the system comprising:
   a central system for managing production orders, the central system including at least a processor and a memory;
   a production order execution module at each of the one or several production sites, the production order execution module being configured for managing a production at a respective production site Si and for controlling the production site production lines in order to enable a production of the product, each of the production order execution modules being connected to the central system;
   said central system and said production order execution modules being configured to manage the production of the product according to claim 1.

9. The system according to claim 8, wherein said central system is configured for automatically selecting in a central database a production scenario for the production of the product.

10. The system according to claim 9, wherein said central database contains multiple scenarios predefined for a production of a product as a function of a nominal list of required production parameters RPP and values associated with each of the required production parameters, and wherein the central system is configured for automatically selecting the production scenario among the multiple predefined scenarios as a function of the product to be manufactured and the required production parameters RPP.

11. The system according to claim 8, wherein said central system comprises a scheduling tool configured for optimizing resource allocation.

12. The system according to claim 8, further comprising the production lines for manufacturing the product, said production lines being configured receiving the production order and for manufacturing the product.

13. The system according to claim 8, wherein said central system is configured for automatically running a constraint satisfaction algorithm or solver for determining the optimal production line, wherein the first, second and third sets of production lines and the target values TV1, TV2, and TV3 defined in association with the first, second and third list, respectively, are used as input, and the set of optimal production lines is an output of the constraint satisfaction algorithm or solver.

14. The system according to claim 8, wherein the constraint satisfaction algorithm is configured for automatically finding an intersection between the first, second and third sets of production lines, and wherein the production lines that are contained within the intersection form the set of optimal production lines.

15. The system according to claim 8, wherein said central system is configured for using a weighting technique associating a weight with each production parameter RPP, CPP, and LPP for ordering from the first, second and third sets of production lines, respectively, the production lines according to a degree of satisfaction of the target values TV1, TV2, TV3 defined in association with the first, second and third list, respectively, the production lines that best satisfy or meet the target values TV1, TV2, TV3, to the production line that least satisfy or meet said target values TV1, TV2 and TV3.

\* \* \* \* \*